US008886396B2

(12) United States Patent
Kobayashi et al.

(10) Patent No.: US 8,886,396 B2
(45) Date of Patent: Nov. 11, 2014

(54) METER DISPLAY DEVICE FOR VEHICLE AND DISPLAY METHOD THEREOF

(71) Applicant: Kawasaki Jukogyo Kabushiki Kaisha, Hyogo (JP)

(72) Inventors: Mitsuru Kobayashi, Hyogo (JP); Shoji Saito, Hyogo (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 53 days.

(21) Appl. No.: 13/667,055

(22) Filed: Nov. 2, 2012

(65) Prior Publication Data
US 2013/0158792 A1 Jun. 20, 2013

(30) Foreign Application Priority Data

Dec. 20, 2011 (JP) .................. 2011-278559

(51) Int. Cl.
G06F 7/00 (2006.01)
B60K 37/02 (2006.01)
G06F 17/00 (2006.01)

(52) U.S. Cl.
CPC ............... *G06F 17/00* (2013.01); *B60K 37/02* (2013.01); *B60K 2350/962* (2013.01); *B60K 2350/2069* (2013.01); *B60K 2350/1064* (2013.01); *B60K 2350/965* (2013.01); *B60Y 2200/12* (2013.01)
USPC ...... 701/36; 701/1; 701/2; 701/432; 340/438; 340/441; 340/459

(58) Field of Classification Search
CPC .................. B60Y 2200/12; B60K 2350/1072; B60K 35/00; B60K 2350/1064; B60K 2310/24; B60K 31/00; B60K 37/00; G06F 17/2235; G06F 17/00; G06F 3/017; G06F 19/3431

USPC ........... 340/438, 691.1, 425.5, 461, 963, 459, 340/462, 441, 995.1, 426.17, 457.1, 870; 116/62.4, 62.1; 701/36, 1, 432, 457, 701/123, 2, 113
See application file for complete search history.

(56) References Cited

U.S. PATENT DOCUMENTS 5,691,695 A * 11/1997 Lahiff ............................ 340/461
6,060,985 A * 5/2000 Siviero ......................... 340/461
(Continued)

FOREIGN PATENT DOCUMENTS

DE    10 2008 064 023    9/2009
FR       2 927 699        8/2009
(Continued)

OTHER PUBLICATIONS

Extended European Search Report issued Apr. 26, 2013 in corresponding European patent application No. 12 19 3210.

*Primary Examiner* — Calvin Cheung
*Assistant Examiner* — Luis A Martinez Borrero
(74) *Attorney, Agent, or Firm* — Wenderoth, Lind & Ponack, L.L.P.

(57) ABSTRACT

The present invention provides a meter display device provided in a vehicle, including a display portion having a display region in which a plurality of display areas extending elongatedly in the left-right direction of a meter body are provided in proximity in a line arrangement in the orthogonal direction orthogonal to the left-right direction, and a display control portion switching each of the display areas between the display operated state and the non-display operated state and increasing the number of the display areas display-operated.

17 Claims, 10 Drawing Sheets

(56) References Cited

U.S. PATENT DOCUMENTS

| | | | |
|---|---|---|---|
| 6,587,759 B2* | 7/2003 | Obradovich et al. | 701/1 |
| 6,812,942 B2* | 11/2004 | Ribak | 345/30 |
| 7,605,693 B2* | 10/2009 | Kulas | 340/438 |
| 2002/0085043 A1* | 7/2002 | Ribak | 345/810 |
| 2004/0046713 A1* | 3/2004 | Tanaka et al. | 345/33 |
| 2006/0072331 A1* | 4/2006 | Yamaguchi et al. | 362/473 |
| 2007/0284172 A1* | 12/2007 | Satake et al. | 180/219 |
| 2008/0141927 A1* | 6/2008 | Takeshige et al. | 116/62.4 |
| 2008/0211651 A1* | 9/2008 | Beutnagel-Buchner et al. | 340/459 |
| 2008/0224840 A1* | 9/2008 | Kawachi | 340/438 |
| 2008/0236474 A1* | 10/2008 | Suita et al. | 116/62.1 |
| 2008/0309475 A1* | 12/2008 | Kuno et al. | 340/462 |
| 2009/0256716 A1* | 10/2009 | Sato et al. | 340/691.1 |
| 2010/0033311 A1* | 2/2010 | Tominaga | 340/425.5 |
| 2010/0321176 A1* | 12/2010 | Hofmann et al. | 340/438 |
| 2011/0006892 A1* | 1/2011 | Karpinsky | 340/461 |
| 2011/0090074 A1* | 4/2011 | Kuno et al. | 340/438 |
| 2011/0175754 A1* | 7/2011 | Karpinsky | 340/963 |
| 2011/0205039 A1* | 8/2011 | Tsuyuguchi et al. | 340/425.5 |
| 2012/0049797 A1* | 3/2012 | Tamaki et al. | 320/109 |

FOREIGN PATENT DOCUMENTS

| | | |
|---|---|---|
| JP | 2006-290182 | 10/2006 |
| JP | 2010-168031 | 8/2010 |

* cited by examiner

METER DISPLAY DEVICE FOR VEHICLE AND DISPLAY METHOD THEREOF

BACKGROUND OF THE INVENTION

1. Field of the Invention

The present invention relates to a meter display device for vehicle and a display method thereof. The present invention relates mainly to a meter display device for vehicle and a display method thereof, which are suitable for a straddle type vehicle, such as a motorcycle.

2. Description of the Prior Art

FIG. 15 shows an example of a display portion of a conventional meter display device for motorcycle. The display portion displays an engine rotation speed and a vehicle driving speed as the changes in the state of the vehicle. For the vehicle driving speed, the numerical value displayed in a display region 100 is varied according to the change in driving speed. For the engine rotation speed, for instance, the display portion has a display region 102 in which a plurality of display areas 101 are provided in proximity in a line arrangement so as to extend in the substantially left-right direction. In the display region 102 of the engine rotation speed, the display length from the left end thereof is changed according to the change in engine rotation speed. With this, the engine rotation speed can be checked. As another conventional known technical document, there is Japanese Patent Application Laid-Open (JP-A) No. 2010-168031.

In a motorcycle, at the time of cornering, the visually checking direction of the driver with respect to the meter display device is often changed in the left-right direction. Then, when the visually checking direction is changed, time required for checking the displayed contents is also changed. On the other hand, in a motorcycle, it is desired that the instantaneous checking operation of the displayed contents changed during driving be enabled under any driving conditions. In vehicles other than a motorcycle, the same thing can be required.

An object of the present invention is to provide a meter display device for vehicle and a display method thereof, in which during driving, the displayed contents of a display portion that the driver desires to know can be easily grasped by an instantaneous checking operation.

SUMMARY OF THE INVENTION

To achieve the object, a meter display device for vehicle according to the present invention includes a display portion having a display region in which a plurality of display areas extending elongatedly in the left-right direction of a meter body are provided in proximity in a line arrangement in the orthogonal direction orthogonal to the left-right direction, and a display control portion switching each of the display areas between the display operated state and the non-display operated state and increasing the number of the display areas display-operated from one end in the orthogonal direction toward the other end in the orthogonal direction with a predetermined state change of the vehicle.

According to the configuration, the change in display with the change in the state of the vehicle, that is, the change in the increase/decrease of the area of the operation display region, is large. Therefore, the driver can easily, instantaneously, and visually check the change in state.

In particular, when the change between the display operated state and the non-display operated state is less, when sunlight reflects on the display surface, or when the seeing direction of the driver is non-orthogonal to the display surface, the driver can instantaneously check the meter displayed contents.

In addition to the configuration, the present invention can preferably have the following configurations.

(a) The display portion is arranged at the center of the left-right width of the meter display device.

With this, the meter display portion can be seen more easily than when the meter display device is arranged on one of the left and right sides. Besides, even when the straight line which connects the display surface of the meter display device and the seeing direction of the driver is not parallel to the orthogonal line orthogonal to the display surface, the displayed contents can be easily checked.

(b) The left-right width of the display areas is set to be sequentially changed in the orthogonal direction.

With this, the change in the area of the operation display region can be different from the change in the number of the display areas displayed. For instance, the change in the area of display to be enhanced can be increased, and the change in the area of display to be non-enhanced can be reduced.

(c) With the configuration, more preferably, the left-right width of the display areas is set to be increased from one end in the orthogonal direction toward the other end in the orthogonal direction.

With this, as the amount of state is changed, the change in the area of display of the display region can be taken more largely than the change in the number of the display areas displayed. The change in the amount of state can thus be easily identified.

(d) The display region is formed to be left-right symmetrical.

With this, even when the seeing direction is shifted in the left-right direction, the change in state can be easily grasped from both the left and right sides.

(e) Codes indicating the state of the vehicle are provided in proximity in a line arrangement in the orthogonal direction corresponding to the display areas.

With this, the change in the amount of state can be easily grasped.

(f) The rotation speed of the drive source of a motorcycle having a transmission is displayed on the display portion.

With this, the rotation speed of the drive source can be easily grasped to easily determine a gear shifting time.

(g) In addition, a motorcycle includes the meter display device for vehicle, the center in the left-right direction of the meter display device being located at the center in the left-right direction of the vehicle.

With this, the same effect as the meter display device can be obtained. In addition, the meter display device can be easily seen at the time of banking the vehicle body.

In addition, the present invention also provides a display method of the meter display device, which will be described next.

A display method of the meter display device for vehicle includes providing in a display portion a display region in which a plurality of display areas extending elongatedly in the left-right direction of a meter body are provided in proximity in a line arrangement in the orthogonal direction orthogonal to the left-right direction, and using a display control portion controlling the display portion to switch each of the display areas between the display operated state and the non-display operated state and to increase the number of the display areas display-operated from one end in the orthogonal direction toward the other end in the orthogonal direction with a predetermined state change of the vehicle.

Of course, the method of the present invention can obtain the same effect as the meter display device of the present invention.

BRIEF DESCRIPTION OF THE DRAWINGS

The above and other objects, features and advantages of the present invention will be become more apparent from the following description taken in connection with the accompanying drawings, in which.

DETAILED DESCRIPTION OF THE PREFERRED EMBODIMENTS

FIGS. 1 to 9 show an embodiment of a meter display device for vehicle according to the present invention. The meter display device is provided in a motorcycle equipped with an internal combustion engine and a transmission. For convenience in description, the left-right direction seen from the driver on the motorcycle is the left-right direction of the motorcycle and the meter display device.

Figure 1:
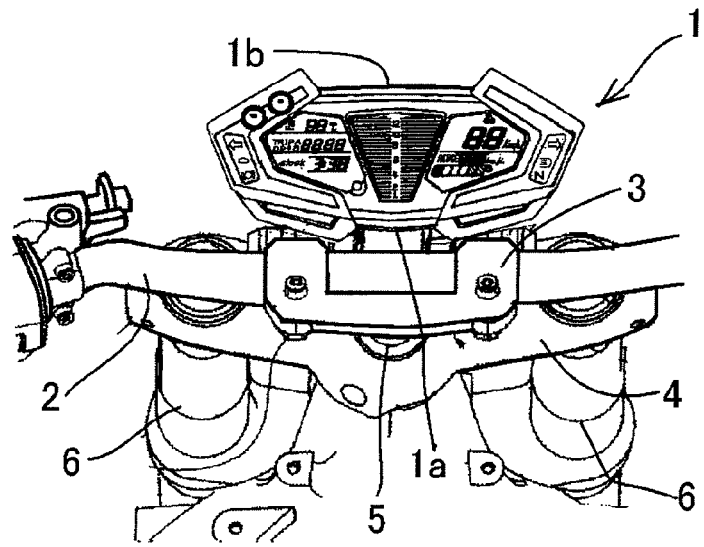
FIG. 1 is a perspective view of an operating portion of a motorcycle having a meter display device according to the present invention seen from the rear and the top.

FIG. 1 is a perspective view of an operating portion of the motorcycle seen from the rear and the top. A meter display device 1 is arranged in front of a handlebar 2 so as to be located at the substantially center of the left-right width of a vehicle body. By an attaching bracket 3, the meter display device 1 is attached to an upper bracket 4 for steering together with the handlebar 2. The upper bracket 4 has left and right ends connected to the upper ends of left and right front forks 6. By steering the handlebar 2 in the left-right direction, the meter display device 1 is moved in the left-right direction (angle shifted) about a steering shaft 5 together with the handlebar 2 and the upper bracket 4.

The meter display device 1 is inclined forward and upward relative to the horizontal plane (e.g., 10° to 80°). That is, the meter display device 1 is inclined so that a device distal end (front upper end) 1b on the opposite side of the handlebar side is located forward and upward relative to a device base end (rear lower end) 1a on the handlebar side.

Figure 3:
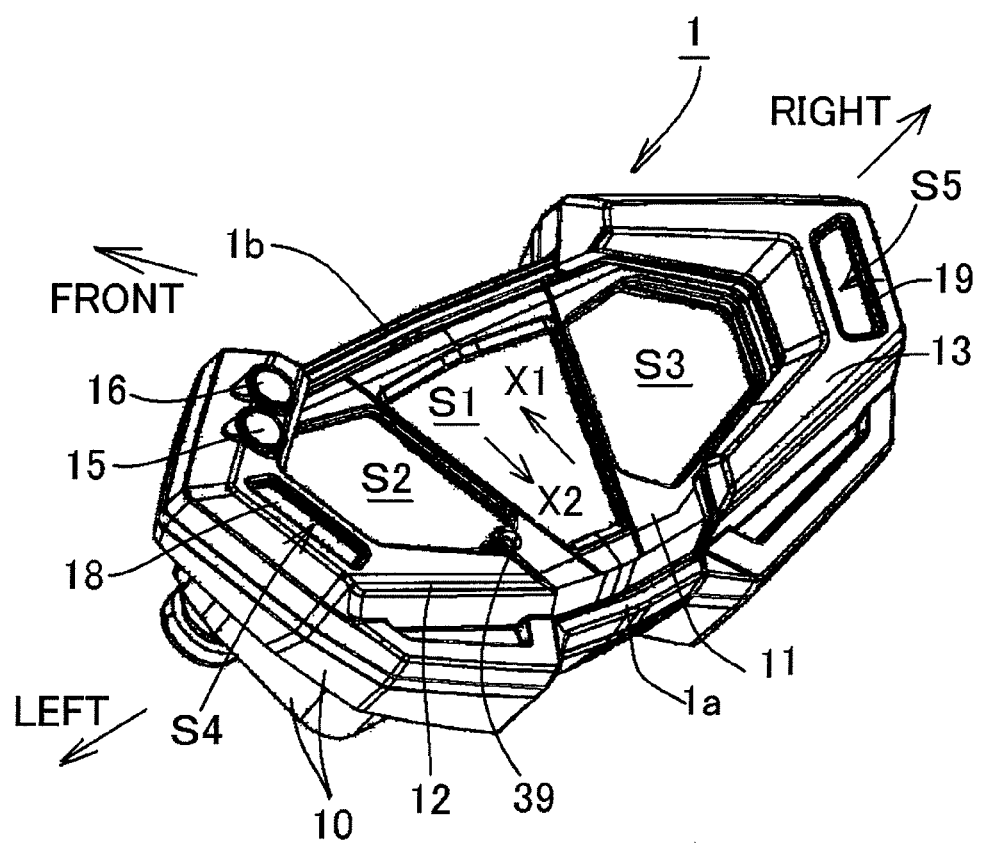
FIG. 3 is a perspective view of the meter display device of FIG. 1 seen from the left and the rear.

FIG. 3 is a perspective view of the meter display device 1 seen from the left and the rear. The meter display device 1 has a metal meter body 10 elongated in the left-right direction, a transparent plate (not shown) covering a display surface, a resin frame member 11 dividing the display surface into three regions (display portions), and U-shaped cover members 12 and 13 attached to the left and right ends of the frame member 11. Here, the direction orthogonal to the left-right direction and from the device base end 1a side toward the device distal end 1b side along the meter display surface (front up direction) is called an X1 direction, and the direction orthogonal to the left-right direction and from the device distal end 1b side toward the device base end 1a side along the meter display surface (rear down direction) is called an X2 direction.

Figure 4:
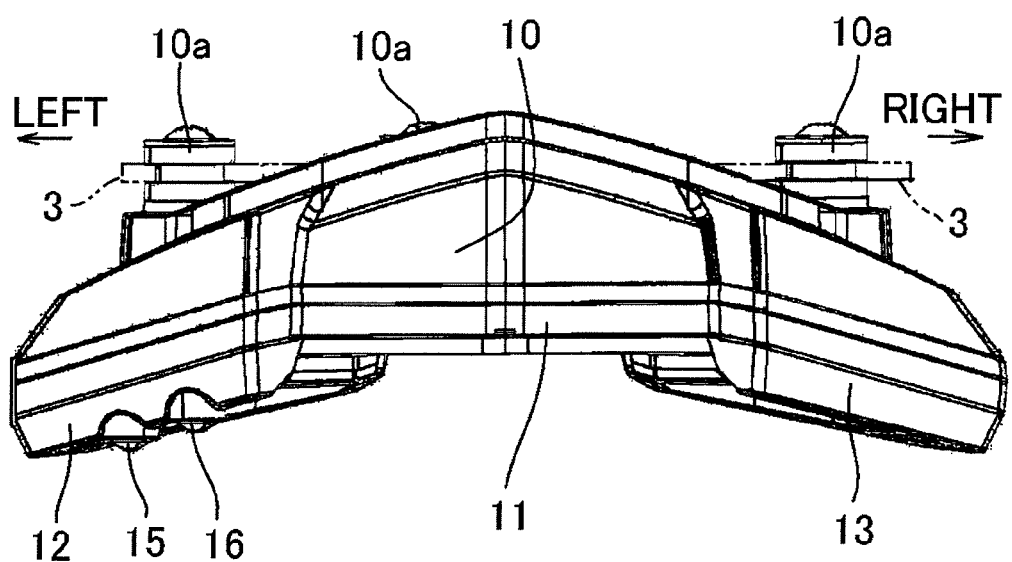
FIG. 4 is a plan view of the meter display device of FIG. 1 seen from the front and the top.

FIG. 4 is a diagram of the meter display device 1 seen from the front and the top. The meter body 10 is formed on its back side with a plurality of (e.g., three) attached portions 10a which are attached to the attaching bracket 3.

Figure 5:
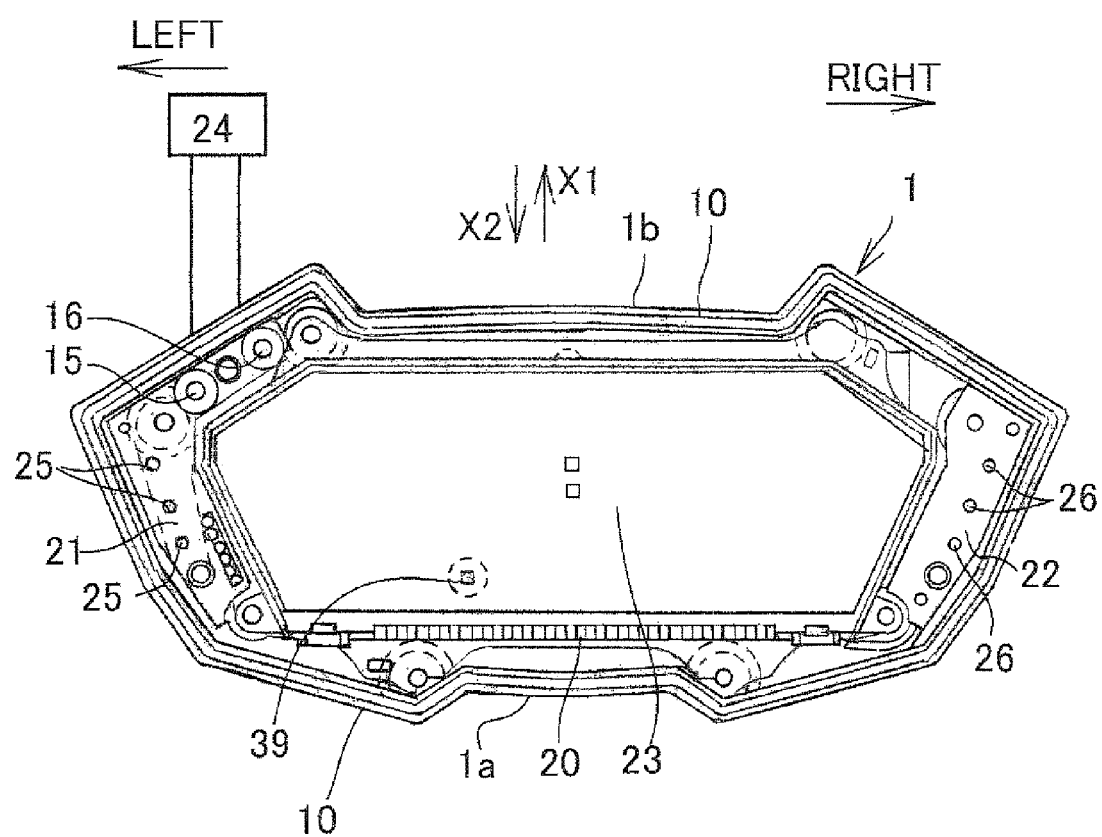
FIG. 5 is a front view showing the interior of the meter display device of FIG. 1.

FIG. 5 is a front view of the interior of the meter body 10 from which the frame member 11, the cover members 12 and 13, and the transparent plate in FIG. 4 are removed. The meter body 10 accommodates therein a liquid crystal display substrate (LCD substrate) 20 long in the left-right direction, and a pair of light emitting diode substrates (LED substrates) 21 and 22 at the left and right ends thereof. On the front side of the liquid crystal display substrate 20, a liquid crystal display (LCD) 23 having substantially the same area as the liquid crystal display substrate 20 is arranged as a display portion. On the light emitting diode substrate 21, a plurality of LED lamps 25 are arranged, and on the light emitting diode substrate 22, a plurality of LED lamps 26 are arranged.

Further, at the left end in the X1 direction of the meter body 10, a set button 15 and a reset button 16 for setting display specifications and for switching display modes are arranged.

The substrates 20, 21 and 22 are electrically connected to a display control portion 24. As the display control portion 24, an ECU (engine control unit) mounted on the motorcycle is used.

[The Layout of the Entire Display Surface]

Figure 2:
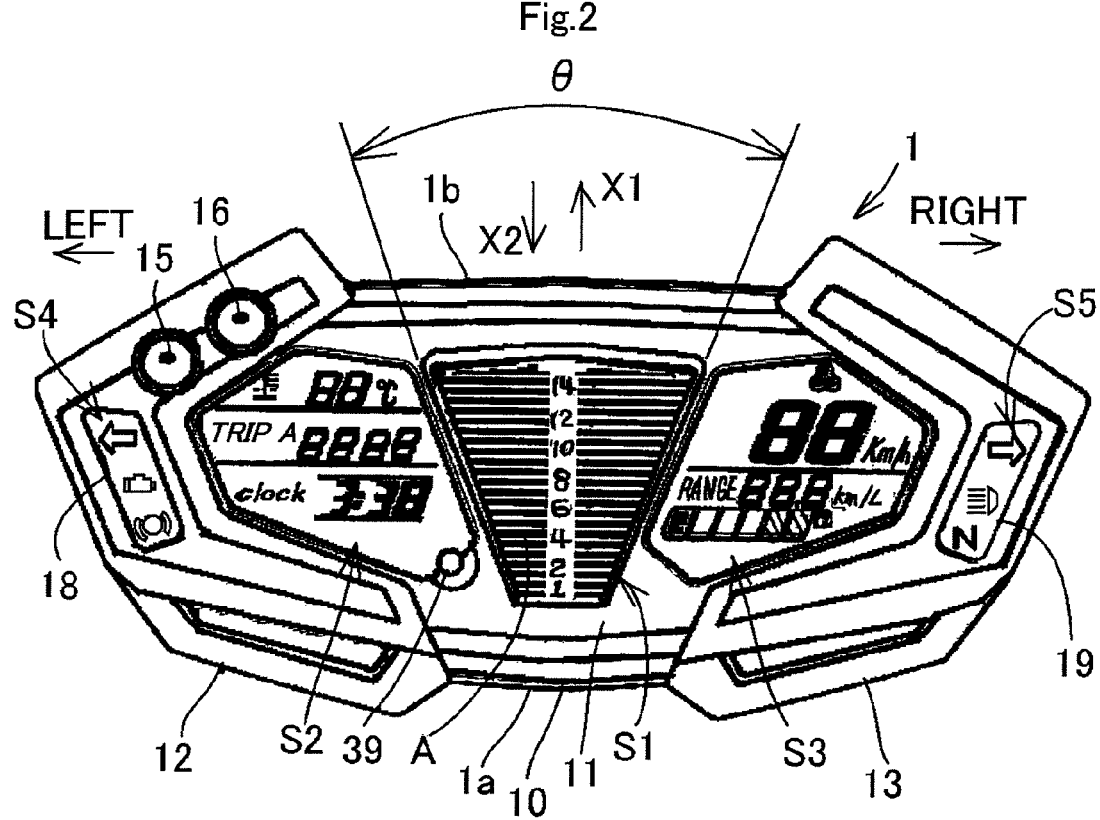
FIG. 2 is a front view of the meter display device of FIG. 1 seen from the rear and the top.

FIG. 2 shows the entire display surface of the meter display device 1. The display surface of the liquid crystal display 23 (FIG. 5) is divided by the frame member 11 into three: a center display region S1 at the center in the left-right direction, a left display region S2, and a right display region S3. Further, the left and right cover members 12 and 13 have window holes 18 and 19, respectively. The window holes 18 and 19 define a left sub-display region S4 and a right sub-display region S5 displayed by the LED lamps 25 and 26, respectively. Each of the window holes 18 and 19 has a transparent display plate.

[The Configuration of the Center Display Region S1]

The center display region S1 is a rotation speed display portion (tachometer portion) to which the present invention is applied, and displays, as the change in the state of the vehicle, the rotation speed of the engine as a drive source. In the embodiment, a gasoline engine is mounted as a drive source. However, when an electrically-operated motor is mounted as a drive source, the rotation speed thereof is displayed.

The center display region S1 is formed in a left-right symmetrical trapezoidal shape (to be exact, a pentagonal shape) such that the left-right width thereof is increased from the device base end 1a side toward the device distal end 1b side (in the X1 direction). The center display region S1 preferably has a large area which is 10% or more of the entire display surface. More preferably, the area of the center display region S1 is 25% or more of the entire display surface. In the embodiment, the area of the center display region S1 is 30% of the area of the entire display. In addition, when widened angle θ of the center display region S1 whose left-right width is increased in the X1 direction is too small, the operation display area is changed less. When widened angle θ is too large, the display region is excessive. Preferably, widened angle θ is left-right symmetrical, and is 10° or more and 80° or less. In the embodiment, θ=30°.

In the center display region S1, a large number of display areas A for displaying engine rotation speeds are arranged in the X1/X2 direction so as to extend in an elongated band shape in the left-right direction. Each of display areas A can be switched between the display operated state and the non-display operated state. In the embodiment, the display operated state refers to the non-transparent state (black state) of the liquid crystal, and the non-display operated state refers to the transparent state (white state) of the liquid crystal.

As described above, the left-right length of each of display areas A is longer than the length thereof in the X1/X2 direction. Preferably, the left-right length of each of display areas A is three times the length thereof in the X1/X2 direction.

Ten or more display areas A are preferably arranged in the X1/X2 direction. In this embodiment, 27 display areas A are arranged in the X1/X2 direction. Display areas A are spacedly aligned in the X1/X2 direction. With this, segment type liquid crystal display is formed. For the arranging density in the X1/X2 direction of display areas A, for instance, two display areas A in the X1/X2 direction are arranged within the increase/decrease range of 1000 rpm.

Display areas A are arranged in almost all of the center display region S1. As described above, in this embodiment, the center display region S1 is formed in a trapezoidal shape such that the left-right width thereof is increased in the X1 direction. Corresponding to the trapezoidal shape, the left-right width of display areas A is sequentially increased from the device base end 1a side toward the device distal end 1b side. Therefore, the left-right width of display area A closest to the device distal end 1b side is the largest, and the left-right width of display area A closest to the device base end 1a side is the smallest.

In addition, display areas A can be light amount-regulated. Display areas A are controlled to reduce the light amount thereof in the daytime in which it is bright and to increase the light amount thereof in the nighttime in which it is dark.

The center display region S1 is formed at the center of the left-right width thereof with a blank band-shaped section extending from the device base end 1a side toward the device distal end 1b side. The blank band-shaped section displays, as codes, numerical values indicating rotation speeds. Each of the numerical values indicates ×1000 rpm. The numeral values "1, 2, 4, 6, 8, 10, 12, and 14" are shown from the device base end 1a side in that order. That is, although the numerical values "1 and 2" are continuously shown, after that, the odd values (3, 5, . . . , 13) are not shown and only the even values are shown. With this, the center display region S1 can be easily seen.

In FIG. 2, all display areas A are in the display operated state. During driving, the number of display areas A in the display operated state is controlled to be sequentially increased from the device base end 1a side toward the device distal end 1b side corresponding to the increase of the engine rotation speed. With this, the area of operation display is increased from the device base end 1a side.

Figure 7:
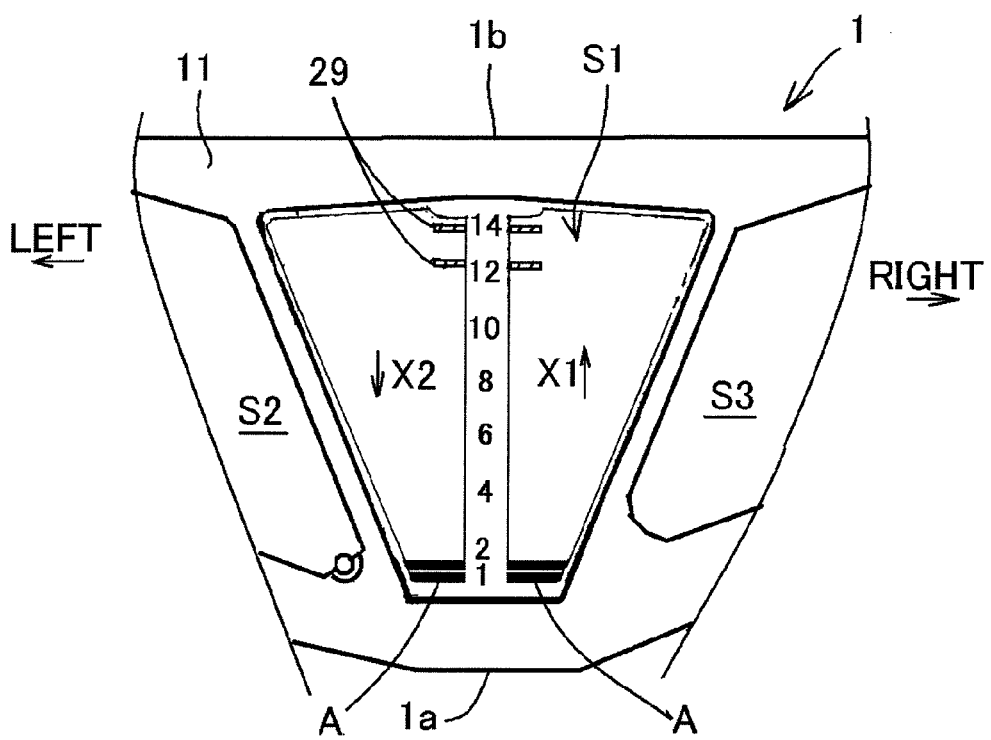
FIG. 7 is an enlarged front view of the same rotation speed display region as FIG. 6 showing a state at the time of idle rotation.

FIG. 7 shows the state of the center display region S1 at the time of idling rotation. First and second display areas A from the device base end 1a side are in the display operated state.

Figure 6:
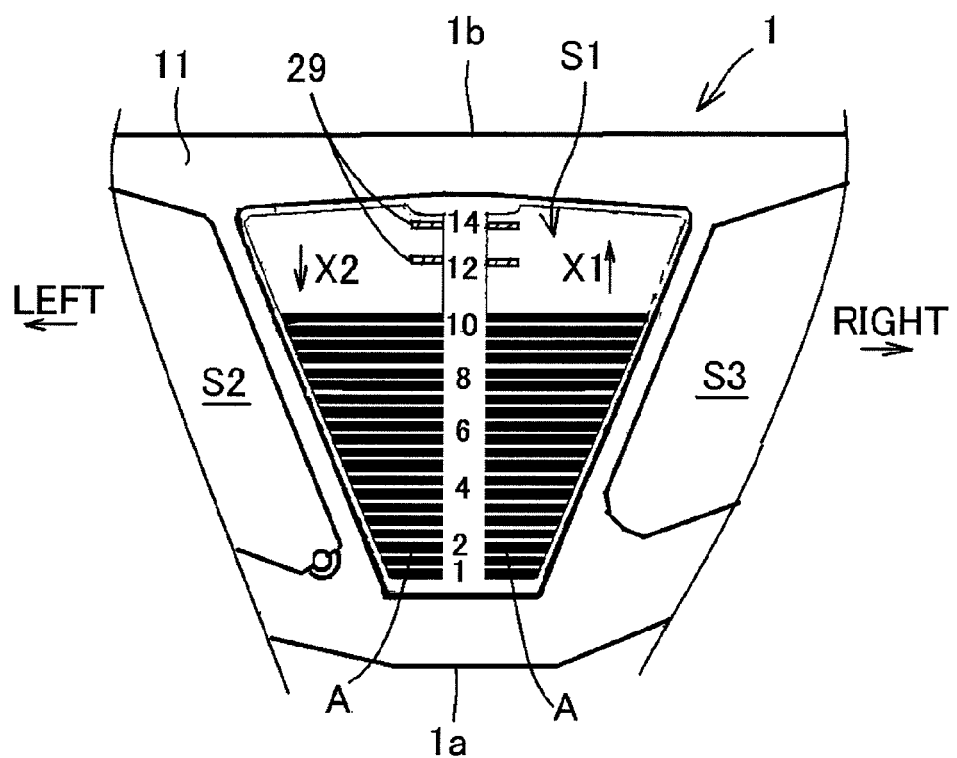
FIG. 6 is an enlarged front view of a rotation speed display region showing a state at about 10000 rpm.

FIG. 6 shows a state near 10000 rpm. First to 20th display areas A from the device base end 1a side are in the display operated state. In this way, with the increase of the engine rotation speed, the area of operation display is sequentially increased from the device base end 1a side. Besides, toward the high speed rotation side, the left-right width of each of display areas A becomes larger. The area increase rate can thus be higher. The display areas included in the red zone region on the high speed side (about 12000 to 14000 rpm) have colored display portions 29.

[The Configuration of the Left Display Region S2]

In FIG. 2, while as described above, the center display region S1 is formed in a trapezoidal shape such that the left-right width thereof is increased in the X1 direction (front up direction), the left display region S2 is projected toward the center of the left-right width of the meter display device 1 in the X2 direction (rear down direction). Specifically, the left display region S2 has a right edge projected rightward in the X2 direction.

In the left display region S2, an oil temperature, a driving distance, and a clock are displayed from the device distal end 1b side in that order. Further, at the right end of the left display region S2 in the X2 direction, a warning LED lamp 39 (LED on the left lower side of the center) is arranged.

[The Configuration of the Right Display Region S3]

While as described above, the center display region S1 is formed in a trapezoidal shape such that the left-right width thereof is increased in the X1 direction (front up direction), the right display region S3 is projected toward the center of the left-right width of the meter display device 1 in the X2 direction (rear down direction). Specifically, the right display region S3 has a left edge projected leftward in the X2 direction.

In the right display region S3, a vehicle speed, a gas mileage, and a remaining fuel quantity are displayed from the device distal end 1b side in that order. In the right display region S3, the display of the vehicle speed is set to be larger than the display of the remaining fuel quantity and the display of the gas mileage. In addition, the number itself of the display of the vehicle speed is inclined rightward in the X1 direction.

[The Configurations of the Sub-Display Regions S4 and S5]

The display surfaces of the sub-display regions S4 and S5 are located rearward and upward from the display surface of the center display region S1 in the direction perpendicular to the display surface.

In the left sub-display region S4, the states of a left blinker, oil (in emergency), and an ABS are lit and displayed from the device distal end 1b side in that order. In the right sub-display region S5, the states of a right blinker, a high beam, and a neutral position are lit and displayed from the device distal end 1b side in that order.

[The Configurations of the Set Button 15 and the Reset Button 16]

Figure 9:
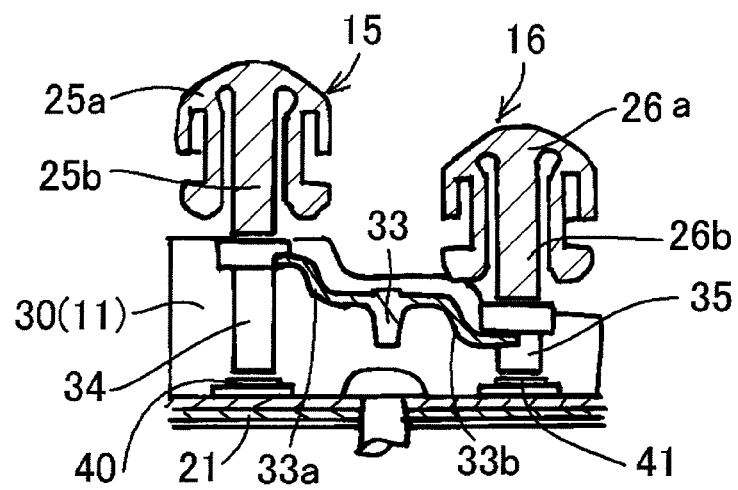
FIG. 9 is a longitudinal sectional view of FIG. 8.

In FIG. 9, the set button 15 and the reset button 16 of the embodiment have different heights from contact switches 40 and 41 on the light emitting diode substrate 21. However, in order that shared keytops 25a and 26a can be used, relay pins 34 and 35 for pressing having different lengths are formed integrally with the resin frame member 11. That is, an attaching base 30, an arm supporting portion 33, a pair of arms 33a and 33b flexibly extending from the arm supporting portion 33, and the relay pins 34 and 35 at the ends of the arms 33a and 33b are formed integrally with the resin frame member 11.

One end in the length direction of the relay pin 34 abuts onto or faces to the contact surface of the contact switch 40. One end in the length direction of the relay pin 35 abuts onto or faces to the contact surface of the contact switch 41. The other end in the length direction of the relay pin 34 faces to the end of a pressing arm 25*b* formed integrally with the keytop 25*a* of the button 15. The other end in the length direction of the relay pin 35 faces to the end of a pressing arm 26*b* formed integrally with the keytop 26*a* of the button 16.

The keytops 25*a* and 26*a* are tubular. The pressing arms 25*b* and 26*b* are arranged in the keytops 25*a* and 26*a*, respectively.

By pressing the keytops 25*a* and 26*a*, the contact switches 40 and 41 can be turned on and off via the pressing arms 25*b* and 26*b* and the relay pins 34 and 35.

The Operations of the Embodiment

As shown in FIG. 7, during idling rotation, in the center display region S1, first and second display areas A from the device base end 1*a* side are in the display operated state, and remaining display areas A are in the non-display operated state.

The engine rotation speed is increased from the idling rotation state of FIG. 7, so that display areas A are sequentially operated in the X1 direction so as to be in the display operated state.

The number of display areas A switched from the non-display operated state to the display operated state is sequentially increased from the device base end 1*a* side in the X1 direction. Therefore, the area of the entire operation display is gradually increased from the device base end 1*a* side. Besides, in FIG. 6, toward the device distal end 1*b* side, the left-right width of display areas A is gradually increased. Toward the high rotation speed region, the area increase rate is higher.

That is, toward the high speed rotation, the area increase rate of display areas A is higher. The driver can easily instantaneously check the rotation speed.

When the engine rotation speed is decreased, display areas A are sequentially brought into the non-display operated state from display area A closest to the device distal end 1*b* side, which is opposite to the increase of the engine rotation speed.

Display areas A are controlled to reduce the light amount thereof in the daytime in which it is bright and to increase the light amount thereof in the nighttime in which it is dark.

Effects of the Embodiment (1) In FIG. 2, in the center display region S1, a plurality of display areas A extending elongatedly in the left-right direction are provided in proximity in the line arrangement in the X1/X2 direction orthogonal to the left-right direction along the display surface. With the increase of the engine rotation speed of the motorcycle, the number of display areas A in the display operated state is sequentially increased from the device base end 1*a* side toward the device distal end 1*b* side, thereby increasing the area of the operation display region. During driving, the driver can easily, instantaneously, and visually check the change in engine rotation speed. In particular, when the change between the display operated state and the non-display operated state is less, when sunlight reflects on the display surface, or when the seeing direction of the driver is non-orthogonal to the display surface, the driver can easily instantaneously check the change in engine rotation speed. Therefore, when the meter is angle shifted with the steering wheel and when the posture of the driver is moved in the left-right direction, the meter display device can be easily seen.

(2) In FIG. 2, the center display region S1 at the center of the left-right width of the meter display device 1 is the display region of the engine rotation speed. The display surface can be seen more easily than when the center display region S1 is arranged in one of the left and right display regions. Besides, even when the straight line which connects the display surface of the meter display device 1 and the seeing direction of the driver is not parallel to the orthogonal line orthogonal to the display surface, the displayed contents can be easily checked.

(3) In FIG. 2, the left-right width of the display areas A is set to be sequentially changed in the X1 direction. Therefore, the change in the area of the operation display region can be different from the change in the number of display areas A displayed. That is, the change in the area of operation display to be enhanced (high speed rotation state) can be increased, and the change in the area of operation display to be non-enhanced can be reduced. In particular, in the embodiment, the left-right width of display areas A is set to be increased from the device base end 1*a* side toward the device distal end 1*b* side. Therefore, with the increase of the engine rotation speed, the change in the area of display of the operation display region can be larger than the change in the number of display areas A displayed. The change in engine rotation speed can thus be easily identified.

(4) In FIG. 2, the center display region S1 is formed in a left-right symmetrical and substantially trapezoidal shape (to be exact, a pentagonal shape). Even when changing the seeing direction in the left-right direction, the driver can easily grasp the change in rotation speed from both the left and right sides. In addition, the center display region S1 arranged at the center in the left-right direction can be seen more easily.

(5) In FIGS. 6 and 7, the numerical values indicating rotation speeds "1, 2, 4, 6, . . . , 14" are provided in proximity in a line arrangement in the X1/X2 direction. The change in rotation speed can thus be easily grasped. In addition, the appropriate numerical values are omitted. With this, the center display region S1 can be easily seen.

(6) In FIG. 1, in the motorcycle, the center in the left-right direction of the meter display device 1 is located at the center in the left-right direction of the vehicle. Therefore, the display can be easily identified at the time of banking the vehicle body.

(7) In a motorcycle having a transmission, the rotation speed of the engine as a drive source is displayed. The engine rotation speed can be easily grasped to easily determine a gear shifting time.

(8) In FIG. 2, the center display region S1 is formed in a trapezoidal shape such that the left-right width thereof is increased from the device base end 1*a* side toward the device distal end 1*b* side. Therefore, the display regions S2 and S3 adjacent to the left and right of the center display region S1 are formed to be spread to the center of the left-right width thereof toward the device base end 1*a* side. That is, the left-right width of the center display region S1 is narrower toward the device base end 1*a* side. Therefore, the area of the left and right display regions S2 and S3 can be larger to effectively use the entire display surface.

(9) In FIGS. 2 and 5, the display surfaces of the sub-display regions S4 and S5 at the left and right ends using the light emitting diodes 25 and 26 are arranged on the driver side from the display surfaces of the display regions S1, S2, and S3 using the liquid crystal display 23. The lights from the light emitting diodes 25 and 26 are hard to reach the display surface of the liquid crystal display 23. The visibility of the screen of the liquid crystal display 23 can be prevented from being lowered.

That is, the sub-display regions S4 and S5 are located away from the center display region S1 so as to be closer to the eyes of the driver. Specifically, the sub-display regions S4 and S5 are located upward. Therefore, the lights emitted from the sub-display regions S4 and S5 are hard to reach the rotation speed display portion. The display of the rotation speed can be prevented from being hard to see.

(10) The display areas A are spacedly aligned in the X1/X2 direction in the center display region S1. The displayed image can be well-defined. In addition, segment type liquid crystal display is formed, so that the configuration can be simplified.

(11) The display areas A can be light amount-regulated. The light amount can be reduced in the daytime in which it is bright. The light amount can be increased in the nighttime in which it is dark. Therefore, in the daytime, the meter screen can be prevented from glaring. In the nighttime, the display can be prevented from being hard to see.

(12) The display areas A become dark in the display operated state (the non-transparent state of the liquid crystal). Therefore, the contrast at the time of operation becomes high with respect to the bright background of the display regions S2 and S3 adjacent to the center display region S1, thereby easily making the change in rotation speed noticeable. Further, the center display region S1 is partitioned from the left and right display regions S2 and S3 by the frame member 11. The displayed contents can thus be easily read.

(13) In the right display region S3, the vehicle speed and the remaining fuel quantity are displayed together. The driver can easily check the driving state.

(14) In the right display region S3, the gas mileage is displayed between and close to the display of the remaining fuel quantity and the display of the vehicle speed. The gas mileage can be easily checked together with the vehicle speed and the fuel.

(15) In the right display region S3, the display of the vehicle speed is larger than other displays (the gas mileage and the remaining fuel quantity). The vehicle speed which is frequently noted can be easily checked.

(16) In the right display region S3, the number itself of the vehicle speed is displayed to be inclined rightward in the X1 direction. Therefore, even when the left-right size of the right display region S3 is smaller in the X1 direction, the display of the vehicle speed can be large where possible.

(17) The displays which is more likely to be checked even when the driving is not stopped, such as the oil temperature, the driving distance, and the clock, are concentratedly located in the left display region S2. Therefore, information which is likely to be checked by the driver can be checked without checking the displays on both the left and right sides at the time of the stop of driving.

(18) In the left display region S2, a remaining battery amount abnormal state, a fuel abnormal state, an oil temperature abnormal state, and a security abnormal state are selectively displayed. Such abnormal states can be easily determined without checking the displays on both the left and right sides.

(19) In FIG. 2, the warning lamp 39 is arranged toward the center of the left-right width of the center display region S1 and at the end in the X2 direction of the left display region S2. Therefore, the warning lamp 39 is located away from the arranging position of the high rotation speed display portion (on the device distal end 1b side) of the center display region S1. With this, even when the warning lamp 39 is lit or flashed, the high rotation speed display that the driver is likely to need to check can be prevented from being hard to see.

(20) The rotation speed display is set to the center display region S1 away from the left and right sub-display regions S4 and S5. Therefore, even when the displays of the blinkers, the high beam, the engine warning, and the ABS operation are lit, the lights emitted from the sub-display regions S4 and S5 are hard to reach the rotation speed display portion. The display of the rotation speed can thus be prevented from being hard to see.

(21) In FIG. 1, the meter display device 1 is attached to be turnably changed in the left-right direction together with the handlebar 2. In such a case, this embodiment is adopted to ensure the visibility.

Figure 8:
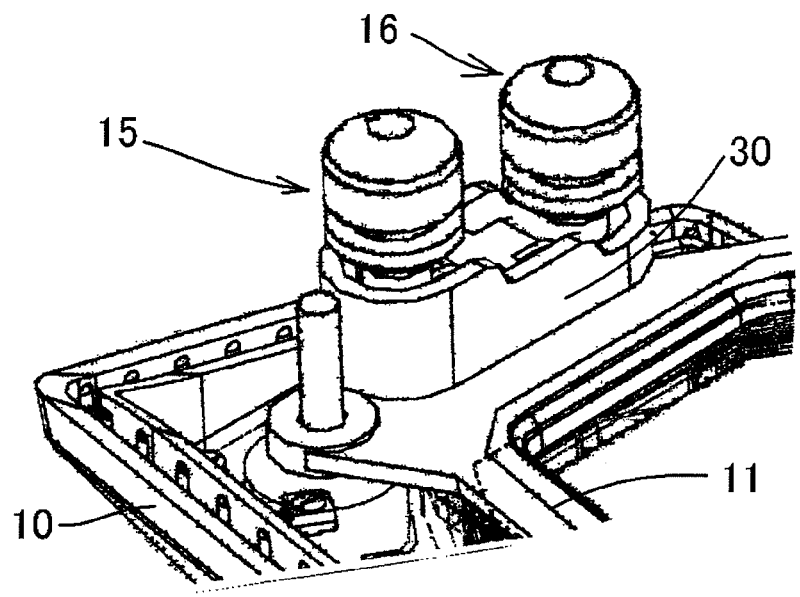
FIG. 8 is an enlarged perspective view of a set button and a reset button.

(22) In FIGS. 8 and 9, the shared keytops 25a and 26a are used as the set button 15 and the reset button 16, and are connected to the contact switches 40 and 41 by means of the relay pins 34 and 35 formed integrally with the resin frame member 11. Therefore, the manufacturing and processing can be easy, and the components for the buttons can be shared.

(23) In the center display region S1, the area of display at low engine rotation speed is small, and the area of display at high engine rotation speed is large. The center display region S1 is preferably adopted in a motorcycle (vehicle) having a high rotation type drive source which is frequently checked at high engine rotation speed. In addition, the area of display is larger with the increase of the amount of state of the vehicle. The center display region S1 can be intuitively understood.

Figure 10:
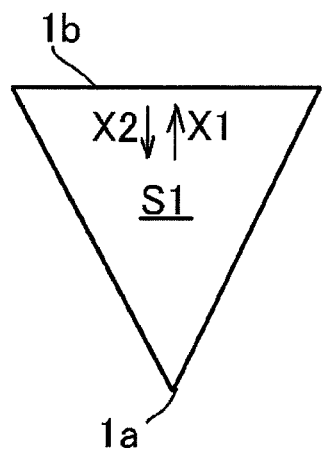
FIG. 10 is a simplified diagram showing a modification example of the shape of the display region.
Figure 11:
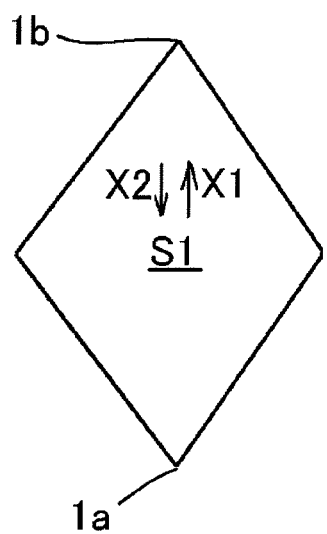
FIG. 11 is a simplified diagram showing another modification example of the shape of the display region.
Figure 12:
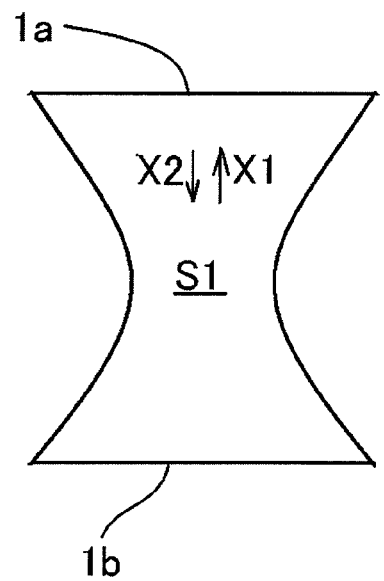
FIG. 12 is a simplified diagram showing a further modification example of the shape of the display region.
Figure 13:
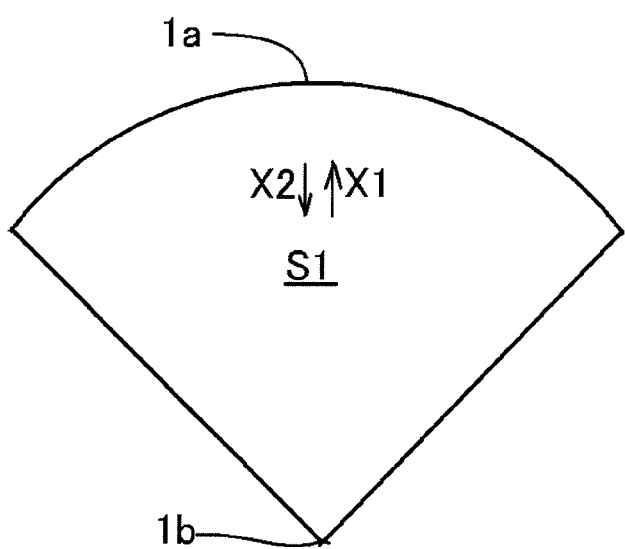
FIG. 13 is a simplified diagram showing a still further modification example of the shape of the display region.
Figure 14:
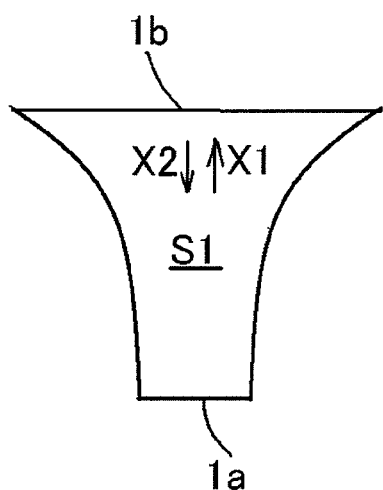
FIG. 14 is a simplified diagram showing a still another modification example of the shape of the display region.
Figure 15:
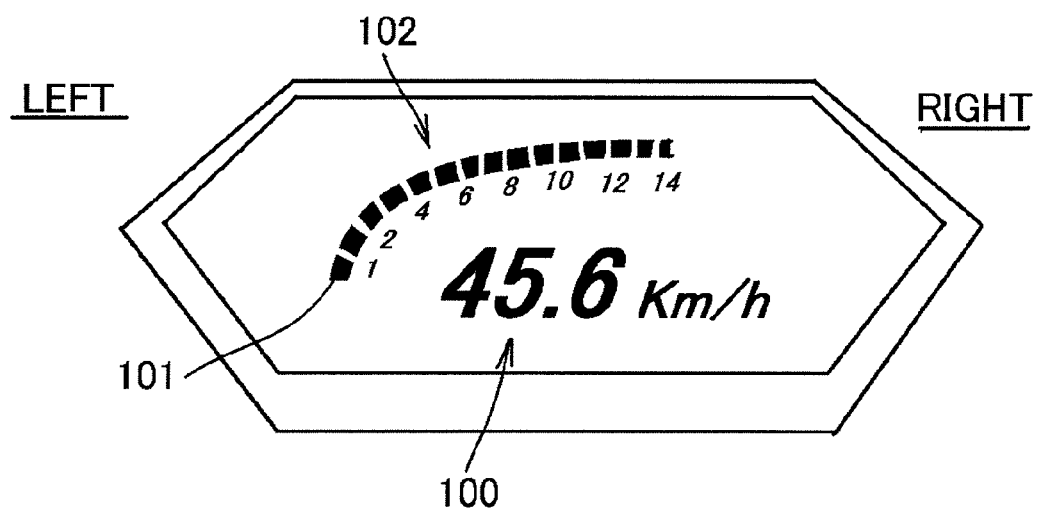
FIG. 15 is a front view of a conventional example.

Other Embodiments (1) FIGS. 10 to 14 are modification examples of the shape of the center display region S1 of FIG. 2. FIG. 10 shows a center display region S1 in an inverted triangular shape such that it has an apex on the device base end 1a side. FIG. 11 shows a center display region S1 in a diamond shape such that it is long in the X1/X2 direction. FIG. 12 shows a center display region S1 in a sandglass shape such that it is constricted at its center in the X1/X2 direction. FIG. 13 shows a center display region S1 in a fan shape such that it has an end in the X2 direction which is the center of the fan. FIG. 14 shows a center display region S1 in a funnel shape such that it is spread in a trumpet form in the X1 direction.

(2) Other than the modification examples of the shape of the center display region shown in FIGS. 10 to 14, the display region to which the present invention is applied can have a shape having a uniform left-right width from the device base end 1a side toward the device distal end 1b side (rectangular shape), and a shape such that the left-right width thereof is increased from the device distal end 1b side toward the device base end 1a side. Of course, in those cases, corresponding to the shape of the center display region, the left-right width of the display areas is made uniform and is sequentially increased from the device distal end side toward the device base end side.

(3) The present invention is applicable to meter devices for all vehicles, such as a straddle type four-wheel vehicle and a working vehicle, in addition to a motorcycle. Although a motorcycle is a vehicle in which the seeing direction of the driver can be moved relative to the meter, the present invention is preferably applicable to a small planing boat and a straddle type four-wheel vehicle in which the weight of the driver is moved at the time of turning to incline the vehicle body because the displayed contents of the meter can be easily seen. In particular, the present invention is preferably applicable to a vehicle having a handlebar.

(4) The present invention is preferably applicable to a vehicle in which external light around the meter, such as sunlight, easily enters into the meter, e.g., a vehicle without a roof over the driver's seat like an open car and a vehicle without a visor around the meter because the display of the contents of the meter can be easily seen.

(5) The present invention is applicable to a vehicle equipped, as a drive source, with an electrically-operated motor or a diesel engine, in addition to a gasoline engine. Any drive sources can thus be used.

(6) The liquid crystal display may be of a reflection type in the daytime and of a light emitting type in the nighttime. In the daytime, the liquid crystal display has high contrast by light there around, and in the nighttime in which it is dark, the liquid crystal display has high contrast by self-emitting light. Typically, when the liquid crystal display is adopted as a display portion, the visible angle can be smaller. However, by adopting the present invention, the rotation speed display can be long in the left-right direction to compensate for the narrowness of the visible angle by the display of the liquid crystal.

(7) Information shown in the display areas is not limited to be applied to the display portion displaying the change in the rotation speed of the drive source, and is applicable to a speed display portion displaying a vehicle speed and a display portion showing the change in a different state of the vehicle. Besides, in addition to the vehicle speed, a driving distance and a drivable amount may be applied. The information changed during driving is displayed so as to be easily checked even during driving.

(8) Other than the modification examples of the shape of the center display region shown in FIGS. 10 to 14, the display region to which the present invention is applied (the center display region of FIG. 2) can have a shape having a uniform left-right width from the device base end 1a side toward the device distal end 1b side (rectangular shape), and a shape such that the left-right width thereof is increased from the device distal end 1b side toward the device base end 1a side. Of course, in those cases, corresponding to the shape of the center display region, the left-right width of the display areas is made uniform and is sequentially increased from the device distal end side toward the device base end side.

(9) In the display region to which the present invention is applied (in the center display region of FIG. 2), in the embodiment, the non-transparent state (black state) of the liquid crystal is used as the display operated state of the display areas. However, this can be reversed. That is, the transparent state (white state) of the liquid crystal can be used as the display operated state, and the non-transparent state (black state) of the liquid crystal can be used as the non-display operated state. In addition, the display modes can be different between the display operated state and the non-display operated state. For instance, the light emitting color and the light emitting amount can be different.

(10) The display region to which the present invention is applied (the center display region of FIG. 2) can have a shape having a uniform left-right width from the device base end 1a side toward the device distal end 1b side (rectangular shape), and a shape such that the left-right width thereof is increased from the device distal end 1b side toward the device base end 1a side. Of course, in those cases, corresponding to the shape of the center display region, the left-right width of the display areas is made uniform and is sequentially increased from the device distal end side toward the device base end side. An inverted triangular shape, a diamond shape, a sandglass shape, a fan shape, and a trumpet shape can also be adopted.

(11) The display region to which the present invention is applied can also be arranged on one of the left and right sides of the meter display device. In addition, the meter display device can also be arranged on one of the left and right sides from the center of the left-right width of the vehicle.

(12) The meter display device to which the present invention is applied can also be attached to a portion such as the head pipe of a motorcycle which is not rotated together with the handlebar. In addition, the meter display device is applicable to a motorcycle without a transmission.

(13) The display region to which the present invention is applied is not limited to a liquid crystal display structure, and may have LED and EL structures. The liquid crystal display is not limited to segment display.

(14) In the embodiment, the present invention is applied to the display portion of the center display region at the center of the left-right width. The present invention may be applied to the display portion of the left display region or the right display region.

(15) In the meter display device of FIGS. 1 and 2, the X1 direction is the front up direction and the X2 direction is the rear down direction. However, the present invention is not limited to this. For instance, the X1 direction may be the front direction or the up direction, and the X2 direction may be the rear direction or the down direction.

(16) The present invention is applicable to a meter display device for a vehicle without a transmission.

(17) The present invention is applicable to the display portions of a vehicle speed, a charging amount, and a fuel, in addition to the display portion of the engine rotation speed. The configuration is preferably adopted for display portions which are frequently checked during driving.

(18) In the embodiment, the numerical values are arranged, as codes, close to the display areas. However, codes indicating the amount of state other than the numerical values may be arranged close to the display areas.

(19) The present invention is not limited to the configuration of the embodiment, and includes various modification examples which can be contemplated within the scope without departing from the contents described in the claims.

What is claimed is:

1. A meter display device for a vehicle, the meter display device comprising:
   a display portion including a display region which includes a plurality of display areas, the plurality of display areas extending elongatedly in a left-right direction, which is a horizontal dimension of the meter display device from a perspective of a driver of the vehicle, the plurality of display areas being provided in proximity in a line arrangement in an orthogonal direction orthogonal to the left-right direction, the orthogonal direction being a direction along a flat surface of the display portion; and
   a display control portion switching each of the display areas between a display-operated state and a non-display operated state and increasing a number of the display areas in the display-operated state from one end in the orthogonal direction toward another end in the orthogonal direction according to a predetermined state change of the vehicle,
   wherein the display control portion displays a current state of the state change of the vehicle by a selected one of (i) means of a number of the display areas that are in the display-operated state and (ii) means of a number of the display areas that are in the non-display operated state.

2. The meter display device for the vehicle according to claim 1, wherein the display portion is arranged at a center of a width of the meter display device in the left-right direction.

3. The meter display device for the vehicle according to claim 1, wherein a width of the display areas in the left-right direction is set to be sequentially changed in the orthogonal direction.

4. The meter display device for the vehicle according to claim 3, wherein the width of the display areas in the left-right direction is set to be increased from the one end in the orthogonal direction toward the other end in the orthogonal direction.

5. The meter display device for the vehicle according to claim 1, wherein the display region is formed to be left-right symmetrical.

6. The meter display device for the vehicle according to claim 1, wherein codes indicating a state of the vehicle are provided in proximity in a line arrangement in the orthogonal direction corresponding to the display areas.

7. The meter display device for the vehicle according to claim 1, wherein a rotation speed of a drive source of the vehicle having a transmission is displayed on the display portion.

8. The meter display device for the vehicle according to claim 1, wherein the display portion includes a center display region for displaying a rotation speed of a drive source at a center of the meter display device in the left-right direction.

9. The meter display device for the vehicle according to claim 8, wherein the center display region is formed in a trapezoidal shape.

10. The meter display device for the vehicle according to claim 1, wherein a change of the number of the display areas that are in the display-operated state or the number of the display areas that are in the non-display operated state becomes larger as the state change of the vehicle becomes larger.

11. The meter display device for the vehicle according to claim 1, wherein the number of the display areas that are in the display-operated state or the number of the display areas that are in the non-display operated state becomes larger as the state change of the vehicle becomes larger.

12. A motorcycle including a meter display device for a vehicle, the meter display device comprising:
    a display portion including a display region which includes a plurality of display areas, the plurality of display areas extending elongatedly in a left-right direction, which is a horizontal dimension of the meter display device from a perspective of a driver of the vehicle, the plurality of display areas being provided in proximity in a line arrangement in an orthogonal direction orthogonal to the left-right direction, the orthogonal direction being a direction along a flat surface of the display portion; and
    a display control portion switching each of the display areas between a display-operated state and a non-display operated state and increasing a number of the display areas in the display-operated state from one end in the orthogonal direction toward another end in the orthogonal direction according to a predetermined state change of the vehicle,
    wherein the display control portion displays a current state of the state change of the vehicle by a selected one of (i) means of a number of the display areas that are in the display-operated state and (ii) means of a number of the display areas that are in the non-display operated state, and
    wherein a center of the meter display device in the left-right direction is located at a center of the vehicle in the left-right direction.

13. A display method of a meter display device for a vehicle, the display method comprising:
    providing in a display portion a display region including a plurality of display areas, the plurality of display areas extending elongatedly in a left-right direction, which is a horizontal dimension of the meter display device from a perspective of a driver of the vehicle, the plurality of display areas being provided in proximity in a line arrangement in an orthogonal direction orthogonal to the left-right direction, the orthogonal direction being a direction along a flat surface of the display portion;

using a display control portion controlling the display portion to switch each of the display areas between a display-operated state and a non-display operated state and to increase a number of the display areas in the display-operated state from one end in the orthogonal direction toward another end in the orthogonal direction according to a predetermined state change of the vehicle; and displaying a current state of the state change of the vehicle by a selected one of (i) means of a number of the display areas that are in the display-operated state and (ii) means of a number of the display areas that are in the non-display operated state.

14. The display method according to claim 13, wherein the vehicle is a motorcycle.

15. A meter display device for a vehicle, the meter display device comprising:
    a display portion including a display region which includes a plurality of display areas, the plurality of display areas extending elongatedly in a left-right direction, which is a horizontal dimension of the meter display device from a perspective of a driver of the vehicle, the plurality of display areas being provided in proximity in a line arrangement in an orthogonal direction orthogonal to the left-right direction, the orthogonal direction being a direction along a flat surface of the display portion; and
    a display control portion switching each of the display areas between a display-operated state and a non-display operated state and increasing a number of the display areas in the display-operated state from one end in the orthogonal direction toward another end in the orthogonal direction according to a predetermined state change of the vehicle,
    wherein the display control portion displays a current state of the state change of the vehicle by a selected one of (i) means of a total area of the display areas that are in the display-operated state and (ii) means of a total area of the display areas that are in the non-display operated state.

16. The meter display device for the vehicle according to claim 15, wherein a change of the total area of the display areas that are in the display-operated state or a change of the total area of the display areas that are in the non-display operated state becomes larger as the state change of the vehicle becomes larger.

17. The meter display device for the vehicle according to claim 15, wherein the total area of the display areas that are in the display-operated state or the total area of the display areas that are in the non-display operated state becomes larger as the state change of the vehicle becomes larger.

* * * * *